United States Patent
Lablans

(10) Patent No.: US 7,580,472 B2
(45) Date of Patent: Aug. 25, 2009

(54) GENERATION AND DETECTION OF NON-BINARY DIGITAL SEQUENCES

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 740 days.

(21) Appl. No.: 11/065,836

(22) Filed: Feb. 25, 2005

(65) Prior Publication Data

US 2005/0184888 A1    Aug. 25, 2005

Related U.S. Application Data

(60) Provisional application No. 60/575,948, filed on Jun. 1, 2004, provisional application No. 60/547,683, filed on Feb. 25, 2004.

(51) Int. Cl.
*H04L 25/49* (2006.01)

(52) U.S. Cl. .................. 375/286; 364/717; 380/46; 331/78; 341/57; 708/492

(58) Field of Classification Search .......... 375/286; 364/717; 380/46; 331/78; 341/57; 708/492
See application file for complete search history.

(56) References Cited

U.S. PATENT DOCUMENTS

| | | | |
|---|---|---|---|
| 3,129,340 A | 4/1964 | Baskin | |
| 3,142,037 A | 7/1964 | Gazale | |
| 3,210,529 A | 10/1965 | Hanson | |
| 3,283,256 A | 11/1966 | Hurowirz | |
| 3,492,496 A | 1/1970 | Callan | |
| 3,515,805 A | 6/1970 | Fracassi et al. | |
| 3,586,022 A | 6/1971 | Bauer | |
| 3,649,915 A | 3/1972 | Mildonian | |
| 3,656,117 A | 4/1972 | Maley et al. | |
| 3,660,678 A | 5/1972 | Maley et al. | |
| 3,663,837 A | 5/1972 | Epstein et al. | |
| 3,671,764 A | 6/1972 | Maley et al. | |
| 3,718,863 A | 2/1973 | Fletcher et al. | |
| 3,760,277 A | 9/1973 | Whang | |
| 3,988,538 A | 10/1976 | Patten | |
| 3,988,676 A | 10/1976 | Whang | |
| 4,286,333 A * | 8/1981 | Franklin | 375/279 |
| 4,304,962 A | 12/1981 | Fracassi et al. | |

(Continued)

OTHER PUBLICATIONS

Panuwat Panratanapaitoon ("Comparison between Gold and PR-QMF codes for CDMA applications", A thesis submitted for the degree of Bachelor of Engineering in Electronic and Communications Engineering, Curtin University of Technology, Western Australia, Oct. 31, 2003).*

(Continued)

*Primary Examiner*—Shuwang Liu
*Assistant Examiner*—Helene Tayong
(74) *Attorney, Agent, or Firm*—Glen M. Diehl; Diehl Servilla LLC

(57) ABSTRACT

Method and apparatus for generating ternary and multi-valued Gold sequences, are disclosed. Also methods to detect ternary and multi-valued sequences are disclosed. The detection can be performed by a ternary or multi-valued LFSR descrambler when the sequences are generated by an LFSR based sequence generator. A wireless system which can assign additional sequences to designated users is also disclosed. The wireless system can also transfer information to user equipment that enables methods for sequence generation and sequence detection.

24 Claims, 11 Drawing Sheets

U.S. PATENT DOCUMENTS

| | | | |
|---|---|---|---|
| 4,378,595 A | 3/1983 | Current | |
| 4,383,322 A | 5/1983 | Halpern et al. | |
| 4,775,984 A | 10/1988 | Jaffre et al. | |
| 4,808,854 A | 2/1989 | Reinagel | |
| 4,815,130 A | 3/1989 | Lee | |
| 4,984,192 A | 1/1991 | Flynn | |
| 4,990,796 A | 2/1991 | Olson | |
| 5,017,817 A | 5/1991 | Yamakawa | |
| 5,157,689 A * | 10/1992 | Kurihara | 375/130 |
| 5,230,003 A | 7/1993 | Dent et al. | |
| 5,412,687 A | 5/1995 | Sutton et al. | |
| 5,457,783 A | 10/1995 | Chhatwal | |
| 5,563,530 A | 10/1996 | Frazier | |
| 5,621,580 A | 4/1997 | Cruz et al. | |
| 5,714,892 A | 2/1998 | Bowers et al. | |
| 5,724,383 A | 3/1998 | Gold et al. | |
| 5,745,522 A | 4/1998 | Heegard | |
| 5,761,239 A | 6/1998 | Gold et al. | |
| 5,790,265 A | 8/1998 | Shikakura | |
| 5,790,591 A | 8/1998 | Gold et al. | |
| 5,844,925 A * | 12/1998 | Dent | 714/819 |
| 5,856,980 A | 1/1999 | Doyle | |
| 5,917,914 A | 6/1999 | Shaw et al. | |
| 5,959,871 A | 9/1999 | Pierzchala et al. | |
| 5,978,412 A | 11/1999 | Takai | |
| 5,999,542 A | 12/1999 | Turner et al. | |
| 6,122,376 A | 9/2000 | Rao | |
| 6,133,753 A | 10/2000 | Thomson et al. | |
| 6,133,754 A | 10/2000 | Olson | |
| 6,192,257 B1 | 2/2001 | Ray | |
| 6,288,922 B1 | 9/2001 | Wong et al. | |
| 6,320,897 B1 | 11/2001 | Fattouche et al. | |
| 6,452,958 B1 | 9/2002 | van Nee | |
| 6,477,205 B1 | 11/2002 | Doblar et al. | |
| 6,519,275 B2 | 2/2003 | Callaway et al. | |
| 6,608,807 B1 | 8/2003 | Lee | |
| 6,788,787 B1 | 9/2004 | Shono et al. | |
| 6,956,948 B1 * | 10/2005 | Hwang et al. | 380/46 |
| 7,219,113 B2 | 5/2007 | Bonaccio et al. | |
| 7,436,963 B2 * | 10/2008 | Lo Iacono et al. | 380/268 |
| 2002/0089364 A1 | 7/2002 | Goldgeisser et al. | |
| 2003/0063677 A1 | 4/2003 | Mix et al. | |
| 2003/0072449 A1 | 4/2003 | Myszne | |
| 2003/0093713 A1 | 5/2003 | Werner et al. | |
| 2003/0099359 A1 | 5/2003 | Hui | |
| 2003/0165184 A1 | 9/2003 | Welborn et al. | |
| 2004/0021829 A1 | 2/2004 | Griffin | |
| 2004/0032918 A1 | 2/2004 | Shor et al. | |
| 2004/0032949 A1 | 2/2004 | Forest | |
| 2004/0037108 A1 | 2/2004 | Notani | |
| 2004/0042702 A1 | 3/2004 | Akimoto | |
| 2004/0054703 A1 | 3/2004 | Huber et al. | |
| 2004/0068164 A1 | 4/2004 | Diab et al. | |
| 2004/0078576 A1 | 4/2004 | Geitinger | |
| 2004/0085937 A1 | 5/2004 | Noda | |
| 2004/0091106 A1 | 5/2004 | Moore et al. | |

OTHER PUBLICATIONS

G. Armanavicius, R. Kazys ("Anlysis of Pseudo noise sequences for multi channel distance measurements", Prof. K. Barsauskas ultrasound institute, Kansa University of Technology, ISSN 1392-2114 ULTRAGARSAS, Nr.4(37).2000).*

Malika De et al ("Fast parallel Algorithm for Ternary multiplication using Multivalued I2L Technology", IEEE Transactions on Computers, vol. 43, No. 5, May 1994).*

Rogers, Derek P., "Non-Binary Spread-Spectrum Multiple-Access Communications", Derek Rogers, Ph. D. Thesis, 213 pages, *The University of Adelaide, Faculty of Engineering*, Adelaide, Australia, Mar. 1995., (Mar. 1995).

* cited by examiner sequence output sequence output

GENERATION AND DETECTION OF NON-BINARY DIGITAL SEQUENCES

STATEMENT OF RELATED CASES

This application claims the benefit of U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS, the entirety of which is hereby incorporated by reference into this document. This application also claims the benefit of U.S. Provisional Patent Application No. 60/575,948, filed on Jun. 1, 2004, entitled MULTI-VALUE CODING OF SEQUENCES AND MULTI-VALUE MEMORY DEVICES, the entirety of which is hereby incorporated by reference into this document.

BACKGROUND OF THE INVENTION

This invention generally relates to the generation and detection of non-binary digital sequences as applied in communications and other applications. The aspect of using binary digital sequences in applications such as wireless communications and watermarking is well known.

In wireless communication systems, such as CDMA, specific binary sequences, comprising a series of elements or chips representing 0s and 1s are used to code individual digital signals, representing the data to be transmitted, in a spread spectrum fashion. A sequence of binary element represents an individual 0 or a 1. When a system comprises a plurality of users, correct transmission of data requires that each individual transmitter is assigned a unique set of sequences representing a 0 and a 1. Presently, the sequences will still be binary sequences. Systems could also apply multi-coding wherein each user can transmit (and receive) sequences in such a fashion that each sequence represents a multi-state symbol. For instance, in 3-state spread spectrum coding, one may assign unique sequences to a user wherein a sequence represents the symbol 0, 1 or 2.

The application of sequences in for instance a wireless communications system may involve a plurality of users. Such a system requires the use of a set of sequences, wherein the sequences should have adequate individual characteristics. One of those characteristics may be the auto-correlation of a sequence. Another characteristic for distinguishing purposes between sequences may be the cross-correlation properties.

One of the present methods to detect the presence of a particular sequence in a received sequence is by generating a local copy of such a sequence and to compare this local sequence with an equal length part of the received signal.

In view of the limited present capabilities to generate desirable multi-valued digital sequences, there is a need for an easier method to create multi-valued digital sequences. There is also a need for creating new sets of multi-valued digital sequences. There is also a need for an easier detection method and new communication systems using the new sequences.

SUMMARY OF THE INVENTION

The general purpose of the present invention, which will be described subsequently in greater detail, is to provide methods of creating, detecting, and using multi-valued digital sequences. There is a need for creating ternary and other multi-valued data sequences with good correlation properties. In accordance with one aspect of the present invention, method and apparatus for creating and using multi-valued sequences are provided. The multi-valued data has 3 or more possible states. The method includes generating the multi-valued sequences.

In accordance with another aspect of the present invention, the generation of the sequences is performed by multi-valued LFSR based methods and apparatus. Further, the multi-valued LFSR based methods, applying a single LFSR do not use a multiplier.

In accordance with another aspect of the present invention, the multi-valued LFSR based methods may apply a plurality of LFSRs of which at least one LFSR does not use multipliers.

In accordance with another aspect of the present invention multi-valued sequences can be created by inputting sequences created by LFSR based methods into a multi-valued device or method that does not apply multipliers and is not a modulo-n adder.

In accordance with a further aspect of the present invention, the multi-valued sequences can be stored into a memory element and be read at the appropriate time, which may be controlled by a clock signal.

Before explaining several embodiments of the present invention in detail, it is to be understood that the invention is not limited in its application to the details of construction and to the arrangements of the components set forth in the following description or illustrated in the drawings. The invention is capable of other embodiments and of being practiced and carried out in various ways. Sequences may be generated and processed in multi-level form by multi-valued logic circuits. Instead of being generated real-time by circuitry, sequences may also be generated first and stored in memory elements for later use. Multi-level sequences may be processed as multi-valued symbols in multi-valued logic circuitry. Multi-level symbols may also be generated in binary form or translated into binary words, and processed as binary multi-bit words by binary circuitry. Processing of multilevel symbols may also take place by way of computer programs, dedicated or general microprocessors, assisted by Analog/Digital and Digital/Analog converters. Processing may take place by way of electronic, optical, mechanical or other switching means. Also, it is to be understood that the phraseology and terminology employed herein are for the purpose of the description and should not be regarded as limiting.

Multi-value and n-value in the context of this application mean a number n, with n being a positive integer greater than two.

A primary object of the present invention is to provide new methods and apparatus for generating and detecting multi-valued sequences.

An object of the present invention is to provide methods and apparatus for creating and generating multi-valued ternary data sequences, wherein symbols in the ternary sequence have one of 3 states.

Another object of the present invention is to provide novel n-valued sequences, wherein symbols in the n-valued sequence have one of n states.

Another object of the present invention is to provide methods and apparatus for creation of multi-valued data sequences, which sequences may be stored for later use.

Another object of the present invention is to provide methods and apparatus for creation of multi-valued Gold sequences, which sequences may be stored for later use.

Another object of the present invention is to provide methods and apparatus for creation of multi-valued data sequences, which sequences may be generated at the time when they are needed.

Another object of the present invention is to provide methods and apparatus for creation of multi-valued Gold data sequences, which sequences may be generated at the time when they are needed.

Another object of the invention is to provide methods for detecting binary and non-binary sequences generated by LFSR based sequence generators.

Another object of the invention is to create multi-valued sequences which may be used in the communications between transmitters and receivers in mobile wireless communication systems.

Another object of the invention is to create multi-valued sequences which may be used in the communications between transmitters and receivers in fixed wireless communication systems.

Another object of the invention is to create multi-valued sequences which may be used in wireless communication systems with a plurality of transmitters and receivers.

Another object of the invention is to increase transmission capacity of a channel by increasing the user assigned sequences.

Another object of the invention is to increase transmission capacity between users by increasing the capacity of a single channel and by increasing the number of channels between users.

Another object of the invention is to assign users sequences based on existing constraints and detection quality of sequences.

Another object of the invention is to create methods to program user equipment for generating multi-valued sequences.

Another object of the invention is to create methods to program user equipment for detecting multi-valued sequences.

BRIEF DESCRIPTION OF THE DRAWINGS

The drawings contain diagrams of LFSR based circuitry. It is well known and assumed that the operation of the shift registers is assisted by a controlling signal, such as a clock signal. In order to minimize the complexity of the diagrams, the depiction of such controlling signals, the diagrams of the related circuitry and the inputs providing such a controlling signal are not included in the diagrams. However, their presence is well known and should be assumed.

Various other objects, features and attendant advantages of the present invention will become fully appreciated as the same becomes better understood when considered in conjunction with the accompanying drawings, and wherein.

DETAILED DESCRIPTION OF THE INVENTION

Transmitting and receiving digital sequences.

The generation of binary or 2-valued sequences has been widely studied and documented. An overview of the art can be found in P. Fan and M. Darnell: "Sequence Design for Communications Applications," John Wiley & Sons, New York, 1996.

There are several aspects related to the usefulness of binary and non-binary sequences. It is assumed that the sequences are generated by a binary or non-binary LFSR (Linear Feedback Shift Register) based circuit. Consequently the sequences have a performance or appearance that is cyclic and can be dependent on the length of the shift register.

Two of the relevant aspects that are important are:
1. The auto-correlation of a sequence
2. The cross-correlation between sequences.

A third aspect that is usually of significance is the occurrence of individual symbols in a sequence. For different reasons, sequences that look like complete random sequences with an equal or almost equal occurrence of possible symbols and with a two-value auto-correlation, are desirable and attractive. A fourth aspect of sequences is orthogonality.

Figure 1:
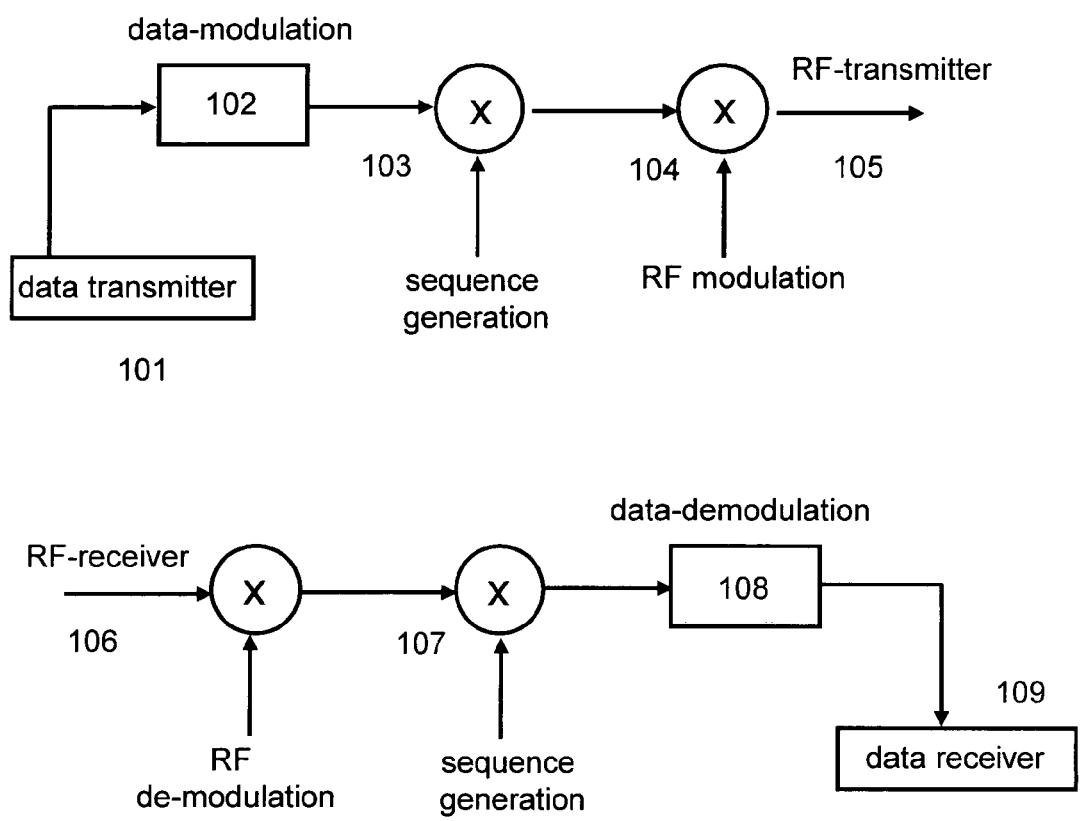
FIG. 1 is a diagram of a spread spectrum transmission and receiver system.

FIG. 1 shows a diagram of the application of sequences in a spread-spectrum coder for wireless application as well as the wireless spread spectrum decoder in signal transmission and reception. The diagram applies to binary and to non-binary systems. A data source 101 provides data which is transformed into a digital data signal by 102. The data-signal is then modulated by a signal spreader 103 into a spread spectrum signal. The circuit 103 may in some cases be considered to be an LFSR based scrambler. In other cases, circuit 103 may be a circuit which replaces an incoming digital signal by a predetermined digital signal. The spread-spectrum signal is provided to a Radio-Frequency modulator that readies the signal for RF transmission. The receiver works in the opposite way. A received RF signal is demodulated by an RF receiver 106. The spread-spectrum baseband signal is provided to a despreader 107. In general, for appropriate dispreading it is required that the despreader 107 provides exactly the same sequence provider by the corresponding spreader 103 synchronized with the provided incoming spread spectrum signal. The despreaded signal is then translated by 108 into data for the data receiver 109.

Figure 2:
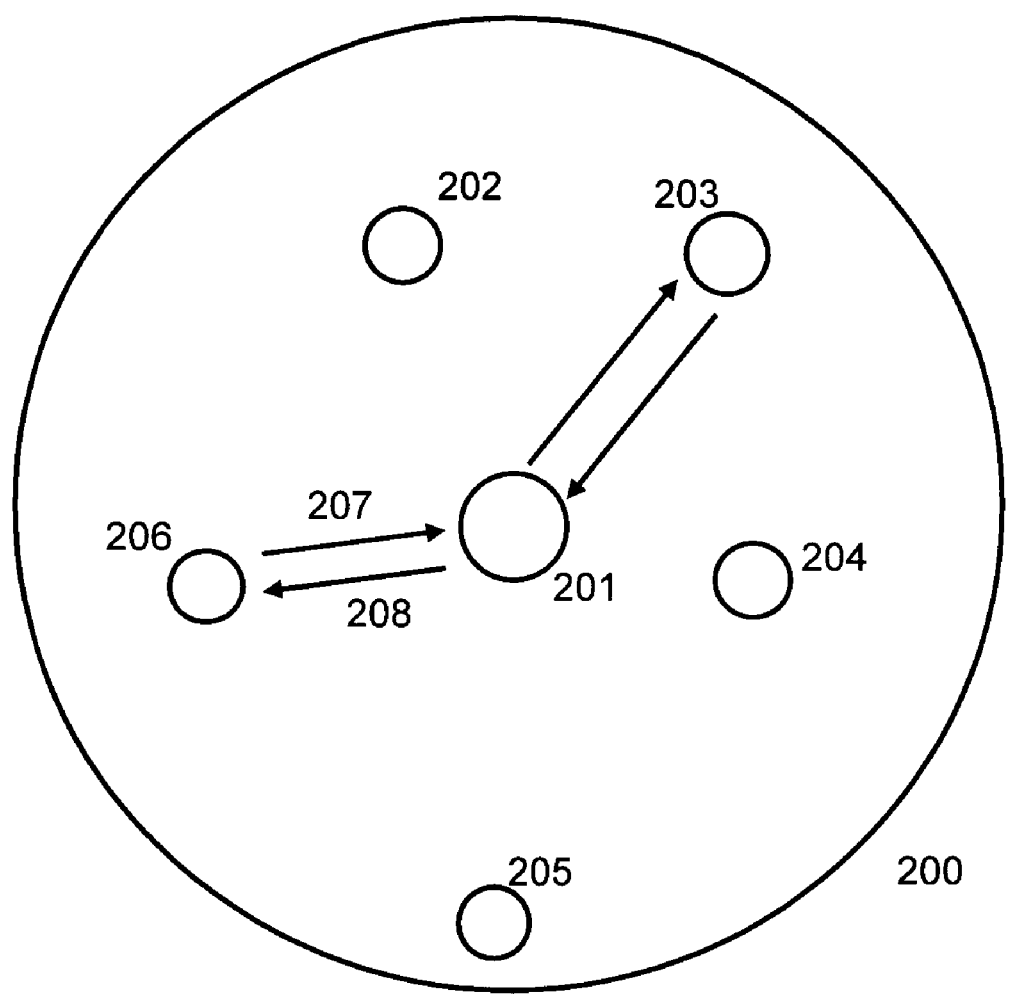
FIG. 2 is a diagram of a wireless cell.

FIG. 2 shows a diagram of a system that can apply the transmitters and receivers of FIG. 1. The system of FIG. 2 comprises a wireless cell 200, controlled by a base station 201 and users 202, 203, 204, 205 and 206. The users may be mobile or fixed in position. It is assumed that users have different bandwidth or data transmission and/or data reception requirements, which may also vary in time. For instance user 206 may, at a certain time, download considerable amounts of data through channel 208 to base station 201, but it does not transmit much data through channel 207. In that case, user 206 requires more bandwidth for channel 208 and perhaps very little for channel 207.

In another case user 206 may transmit a high quality video signal to the base station, but does not receive much data. The situation is reversed compared to the previous case: high bandwidth is required for channel 207 and very little for 208. When user 206 is not active, very little bandwidth is required for either 207 or 208.

Especially in bandwidth congested areas it would be beneficial when base station 201 can dynamically assign bandwidth as required by the needs of active users, thus making much better use of available bandwidth and optimize the use of bandwidth in spectrum constrained circumstances.

In accordance with one aspect of the present invention, multi-value sequences can provide a better use of bandwidth.

In accordance with another aspect of the present invention it is possible to assign more sequences to a single channel, allowing for an increased bandwidth use. In general a channel is assigned two sequences, representing a binary 0 and a binary 1. It is also possible to assign a channel for instance 4 sequences, representing a 4-valued symbol 0, 1, 2 or 3. In that case the assigned bandwidth has essentially doubled for that channel. It is understood that, in those cases, the systems are equipped with methods or apparatus to code and decode information into multi-value symbols. These methods are well known and have been applied in transmission-coding. An example is the 4B3T code.

Multi-coding in CDMA is known. It generally comprises sending multiple orthogonal sequences at the same time to a user. For the detection of each sequence a correlation circuit is required. According to one aspect of the present invention, multi-code or multi-sequence transmission also includes sending one sequence at a time, which sequence can be one of n, representing one of n symbols. Such a multi-code system allows for much easier detection of sequences.

It is also possible to activate additional transmitter/receiver channels for individual users. Such a system is known as a multi-carrier system. The channel can be characterized by a channel method which can be for instance a frequency multiplex, a time division multiplex or a code multiplex technology.

The transmission of multi-state symbols over a single channel makes better use of the channel capacity, though there may be adverse noise effects. A somewhat frustrating aspect of multi-state symbol transmission is that the increase of bandwidth is a logarithmic function of the number of states. Assume the equivalent bandwidth of a binary (or 2-state symbol) system as a comparative baseline. When the number of states is increased from 2 to 8 or by a factor 4, the bandwidth is increased by a factor 3. If it is assumed that increasing the number of states increases the equipment cost for processing the signals, it appears that at a certain stage it is cheaper to increase the number of channels for a user rather than the number of states in transmitted symbols.

An example may clarify this. Suppose that the cost of a channel of a certain bandwidth is 1000. The cost of transmitting a symbol with a certain number of states depends on the number of states and is provided in the following table:

| number of states | cost per state |
|---|---|
| 1–2 | 100 |
| 3–4 | 200 |
| 5–8 | 400 |
| 9–16 | 800 |

The cost of creating a 4-state transmission system is then 1600:1000 (for the channel) and 200 (for 2 binary)+400 (for 2 additional states)=600 for a 4-state symbol channel. For a single binary channel the cost would be 1200. For an incremental 400, the capacity of the system has been doubled. For an 8-state symbol channel the cost would be: 1000+200+400+1600=3200. For an additional 2000 the capacity of the binary channel has been tripled.

In order to increase the capacity to 4 times the capacity of the binary channel a 16 state symbol has to be used. The cost of this is 1000+200+400+1600+6400=9600. It would be clearly cheaper to create an additional channel. In fact, 2 4-state symbol channels would increase the capacity with a factor 6 compared to a single binary channel.

While the cost example is fictitious and for illustrative purposes only, it should clarify the fact that an optimum price/performance solution in transmission capacity may involve multi-level coding and multi-carrier channels.

For example, in such a case where two parallel channels are in use for one user, with each channel having assigned 8 different sequences can transmit or receive a symbol with 64 different states in the same time that a single binary channel can transmit or receive a symbol with 2 different states.

Ternary (3-Valued) Sequences.

The general approach in generating ternary sequences is based on Galois Field theory. It uses primitive or irreducible polynomials. The degree and coefficients of such a polynomial determines the length of the shift register in the LFSR based sequence generator, the connected taps and the multiplying factors.

Figure 3:
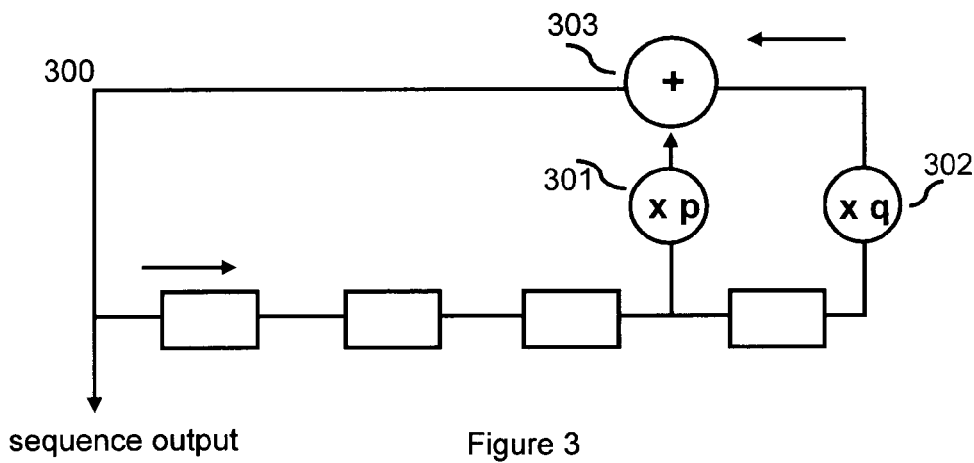
FIG. 3 shows a sequence generator.
Figure 4:
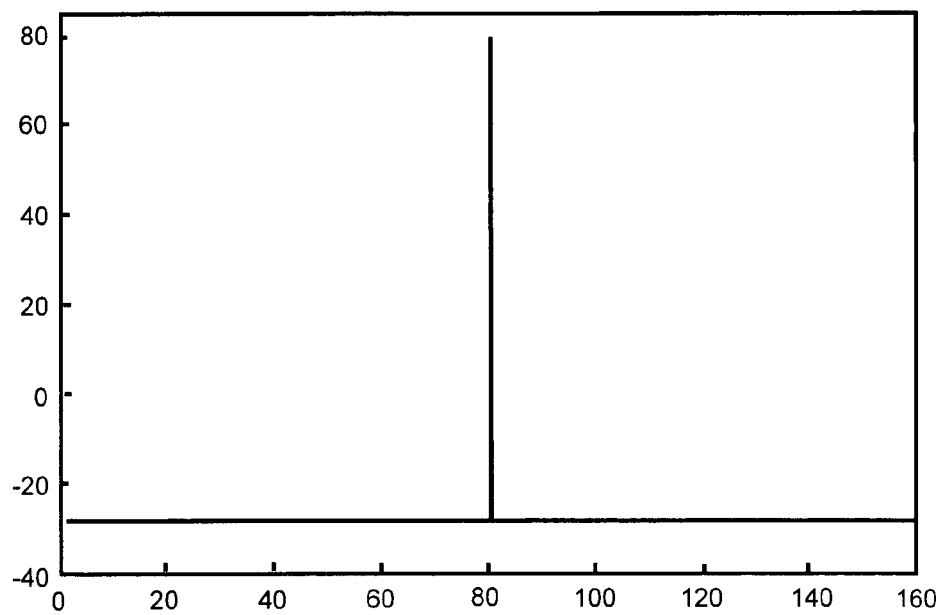
FIG. 4 shows a correlation graph of an m-sequence.

FIG. 3 shows a diagram of a ternary sequence generator, which can be described by a polynomial over GF(3) of degree 4. The circuit 300 contains two multipliers: one multiplier 301, multiplying by p modulo-3 and multiplier 302, multiplying by q modulo-3. According to Galois Field theory, one can create two so-called ternary maximum-length sequences with this configuration. The first configuration is where the multiplying factor p=2 and q=1 in FIG. 3. The other configuration is wherein p=1 and q=1. The auto-correlation graphs of these two sequences have a shape as shown in FIG. 4.

According to an aspect of a previous invention, described in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA, it is possible to increase the correlation value when two identical coincide and decrease the correlation value when two identical sequences are out of synchronization by changing the correlation calculation. However, the general shape of the correlation graph will stay the same.

The two m-sequences generated by the configuration of FIG. 3 are:

| | |
|---|---|
| p = 1; q = 1 | 2010211202022221110221210001001101211002102012210101111222011212000200202122001 |
| p = 2; q = 1 | 2022210011020112020212112102111100010021011200220102211010121221201222200002001 |

Both sequences are generated with the initial shift register content being [1 0 0 2]. Both sequences have a length of 80 ternary symbols.

As is known, other sequences that are cyclically related to the above sequences can also be generated by the circuit or FIG. 3. Thus, there are a plurality of sequences that can be generated by FIG. 3 and a communication system using the sequence generator of FIG. 3 has a plurality of sequences available to communication devices.

The first sequence is generated by the configuration of FIG. 3 with p=1 and q=1. This means the sequence generator is equivalent with the configuration of FIG. 5, wherein the combination of modulo-3 adder with multipliers p and q of FIG. 3 can be replaced by a single ternary logic function ter1. For the case p=1 and q=1 this means that ter1 is equivalent with the modulo-3 addition function.

Figure 5:
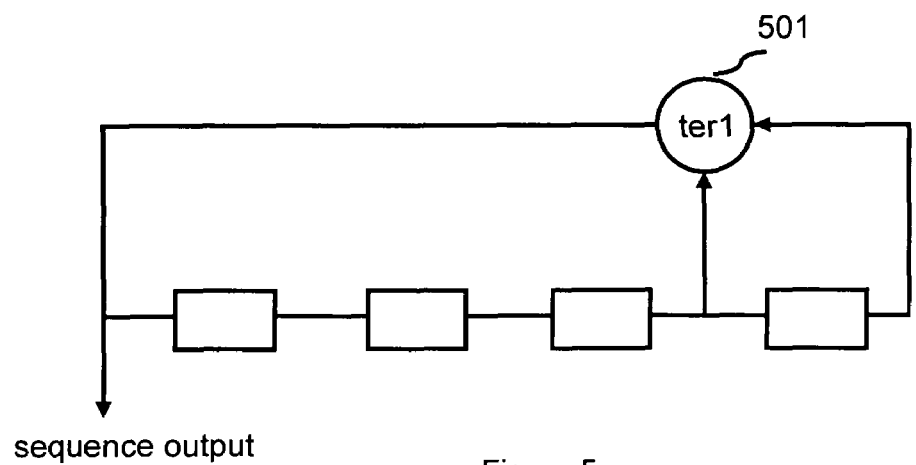
FIG. 5 is a diagram of an LFSR based sequence generator.

For the configuration of FIG. 3 wherein p=2 and q=1 the configuration with function ter1 as shown in FIG. 5 will have a truth table as shown in the next table:

| ter1 | 0 | 1 | 2 |
|---|---|---|---|
| 0 | 0 | 1 | 2 |
| 1 | 2 | 0 | 1 |
| 2 | 1 | 2 | 0 |

Thus, the previous sequences and the related sequences can be generated by the circuit or FIG. 5.

Figure 6:
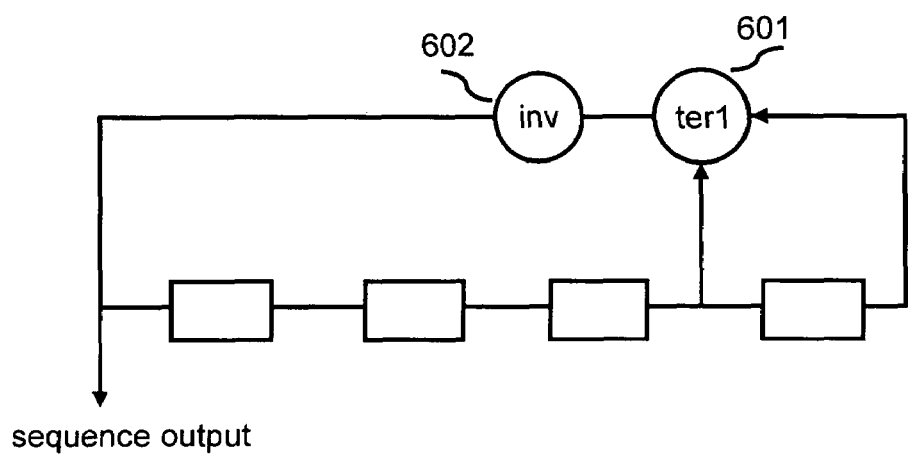
FIG. 6 is a diagram of an LFSR based sequence generator.

According to one aspect of an invention described in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; by the inventor, it is possible to generate additional m-sequences in the configuration of FIG. 5 by applying additional ternary reversible scrambling functions by ternary device 501. It was demonstrated in the cited Patent Application that one can change the ternary logic function ter1 by inserting reversible ternary inverters in the path of the signals. This is shown in a diagram in FIG. 6. This sequence generator has a ternary function ter1 in device 601, followed by a ternary inverter 602. By inserting an inverter inv=[1 2 0] and then an inverter inv=[2 0 1] in the circuit after ternary logic function ter1, one can generate two additional ternary m-sequences which are not anticipated by the existing theory and are novel. The two m-sequences in addition to the sequence generated with the configuration with p=2 and q=1 are shown in the following table:

The sequences seq_ad_2 and seq_ad_3 are generated with the initial content of the shift register being [1 0 0 2], which is the same as used in the previous examples of sequences generated without using the inverters. As known from LFSR based theory, the influence of the initial content of the shift register is that virtually the same sequence will be generated (with the same auto-correlation properties and same distribution of elements), however it will appear as a shifted version of sequences generated with different initial shift register content.

As an example the sequence generator which generated sequence seq_ad_3 with initial shift register content [1 0 0 2] will be used again but with different initial shift register content. The results of 4 of those situations are shown in the following table:

| shift register | sequence |
|---|---|
| [1 1 0 0] | 21210100102100002220221020001221120211002020101101201111222122012111022002120011 |
| [1 1 0 1] | 01201111222122012111022002120011212101001021000022202210200012211202110020201011 |
| [1 1 0 2] | 11222122012111022002120011212101001021000022202210200012211202110020201011012011 |
| [1 1 1 0] | 12221220121110220021200112121010010210000222022102000122112021100202010110120111 |

Analysis of the sequences in the table will show that they are shifted versions of each other.

From this one can conclude that a ternary LFSR based sequence generator with a shift register with p elements can generate at the most $(3^P-1)$ different sequences, which are then a shifted version of each other. A 4-element ternary LFSR based sequence generator can generate 80 different sequences.

When one has the means to determine the correct beginning of a sequence (for instance through correlation) then a set of 80 ternary m-sequences is also a set of 80 different orthogonal sequences.

One aspect of the present invention is to use a descrambler as a sequence detector. It will be explained that the shift register in a descrambler will be 'flushed' by the incoming sequence. Consequently, after flushing, the differentiating aspects of the sequences generated by one sequence generator using different initial contents of the shift register will be lost.

The same reasoning will apply to n-valued sequence generators with a shift register of length p. The length of a sequence, without repeating itself in whole or in part can be at most be a length of $(n^p-1)$ elements.

According to one aspect of the invention of the cited invention one can replace the combination of ternary function ter1 with inverter inv=[1 2 0] with a ternary logic function ter with a truth table as shown in the following table to generate seq_ad_2:

seq_ad_2  01020220210222211121102122201100121002212120200020120000111011201000211221012200 1
seq_ad_3  12121010010210000222022102000122112021100202010110120111122212201211102200212001

| ter | 0 | 1 | 2 |
|---|---|---|---|
| 0 | 1 | 2 | 0 |
| 1 | 0 | 1 | 2 |
| 2 | 2 | 0 | 1 |

One can replace the combination of ternary function ter1 with inverter inv=[2 0 1] with a ternary logic function ter with a truth table as shown in the following truth table to generate seq_ad_3:

| ter | 0 | 1 | 2 |
|---|---|---|---|
| 0 | 2 | 0 | 1 |
| 1 | 1 | 2 | 0 |
| 2 | 0 | 1 | 2 |

Consequently according to different aspects of the invention one can generate more desirable ternary sequences than is possible with the present art by using the ternary logic function shown in the prior two paragraphs. And it is possible to generate ternary sequences with simpler methods using single functions instead of using combinations of modulo-3 addition functions with multipliers or inverters.

According to another aspect of this invention it is possible to create new ternary sequences by using two or more LFSR based ternary sequence generators and combining the outputs of the sequence generators by inputting the output of the sequence generators to a reversible ternary scrambling function. A known way of combining ternary sequences is by applying modulo-3 addition functions. However many more different ternary sequences can be created by applying reversible ternary logic functions, which are not identical to the modulo-3 addition function.

Sequences created by combining other sequences, generally through modulo-n addition, and which have good auto-correlation and cross-correlation properties are known as Gold sequences. One can add another combining step to create for instance Kasami sequences.

Figure 7:
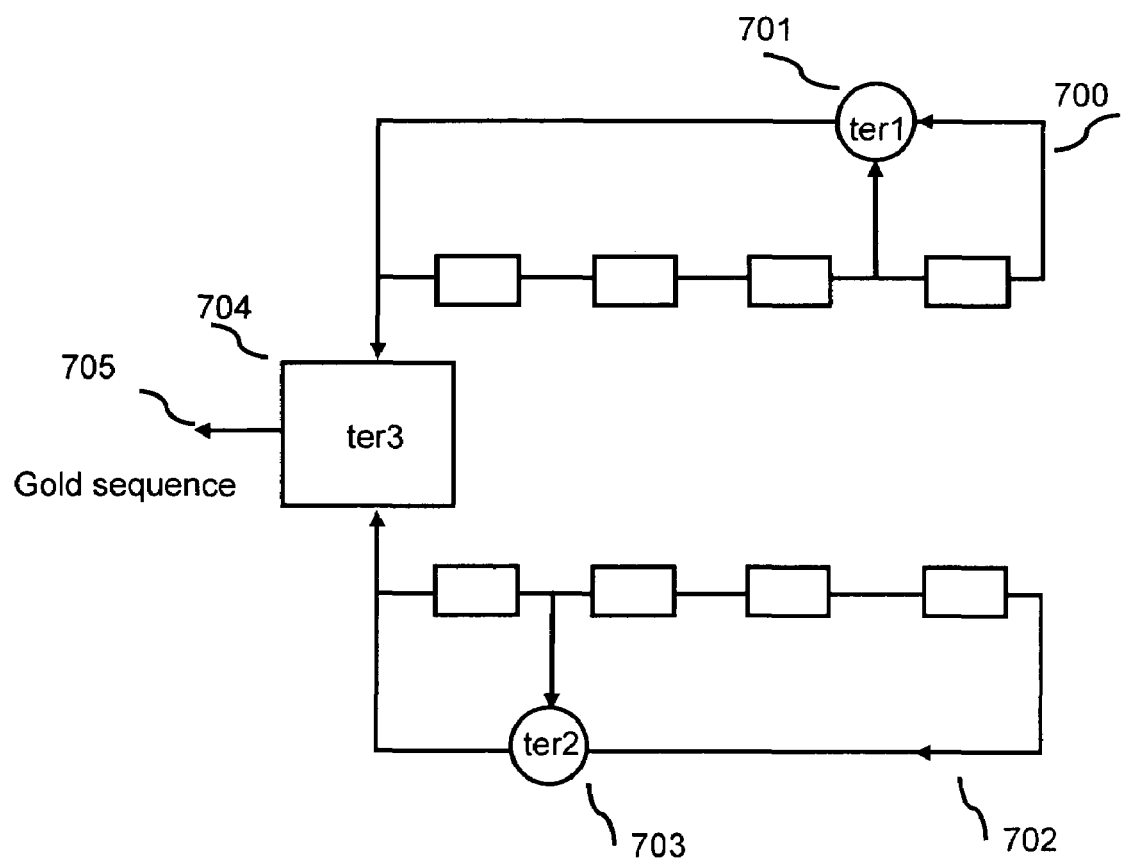
FIG. 7 is a diagram of a Gold sequence generator.

An example of a diagram of a circuit for creating ternary Gold sequences is shown in FIG. 7. The Gold sequence generator comprises a first LFSR based sequence generator 700 with ternary device 701 executing function ter1; a second LFSR based ternary sequence generator 702 with ternary device 703 executing function ter2; the signals of 700 and 702 being inputted to a third ternary device 704 executing function ter3 and outputting a Gold sequence on output 705. The truth tables of the ternary logic functions ter1, ter2 and ter3 are shown in the following tables:

|  | 0 | 1 | 2 |
|---|---|---|---|
| ter1 |  |  |  |
| 0 | 2 | 0 | 1 |
| 1 | 1 | 2 | 0 |
| 2 | 0 | 1 | 2 |
| ter2 |  |  |  |
| 0 | 0 | 1 | 2 |
| 1 | 2 | 0 | 1 |
| 2 | 1 | 2 | 0 |

-continued

|  | 0 | 1 | 2 |
|---|---|---|---|
| ter3 |  |  |  |
| 0 | 0 | 2 | 1 |
| 1 | 1 | 0 | 2 |
| 2 | 2 | 1 | 0 |

Figure 8:
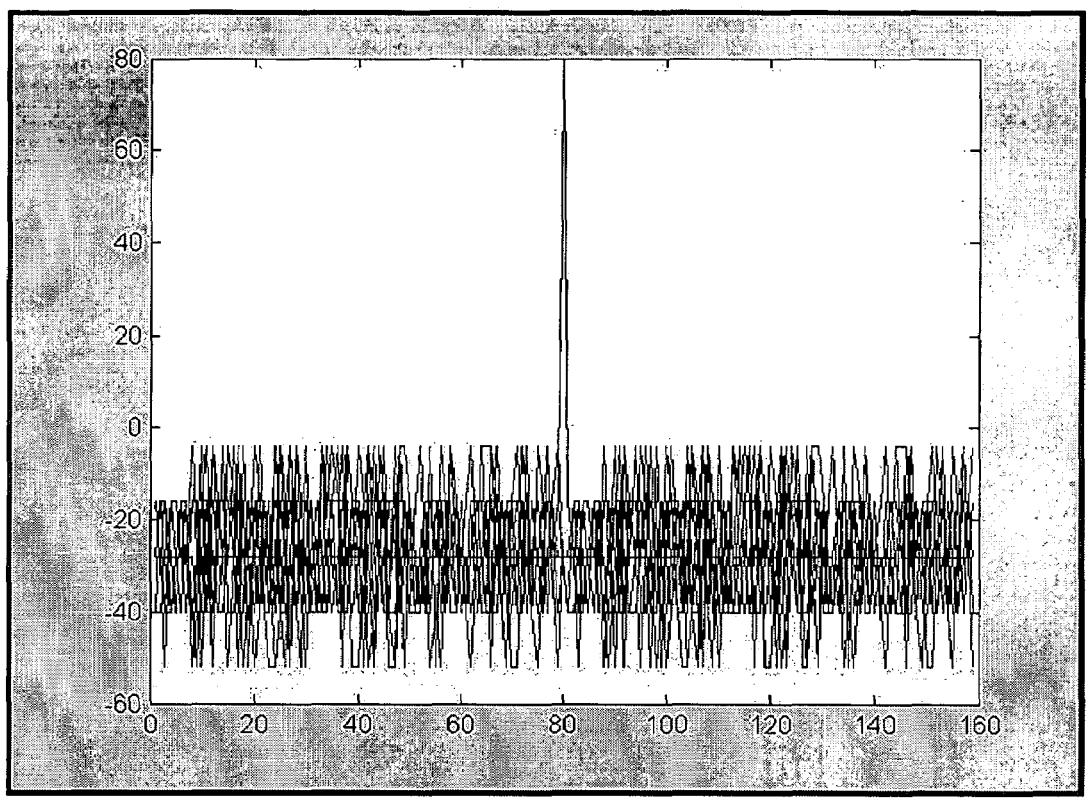
FIG. 8 is an overlay graph of auto-correlation and cross-correlation.

A series of 80 different ternary Gold sequences can be created by keeping the initial content of the shift register of the second sequence generator 702 with ter2 the same but changing the initial content of the shift register of the first sequence generator 700 with ternary logic function ter1. FIG. 8 shows the correlation graph constructed by overlaying the autocorrelation of the first Gold sequence, with the cross correlation of the first Gold sequence and the next 20 Gold sequences. The graph shows how the cross-correlation values stay within a certain range. And it shows the clear distinguishing peak in the auto-correlation. The literature shows different efforts in creating non-binary Gold sequences. The combining function (called ter3 in FIG. 7) that is applied in the known literature is generally the modulo-n function or the modulo-3 addition in the ternary case.

According to one aspect of the present invention all possible reversible ternary functions can be used to combine two ternary sequences. Many of the generated ternary sequences, created by combining two ternary sequences through a ternary reversible function not being the modulo-3 addition, may show attractive or adequate correlation properties. A computer program can be used to generate and select the sequences based on pre-determined correlation criteria. When the cross-correlations between these sequences, created by combining two ternary sequences, assume values within a limited range, and the individual auto-correlation graphs show a significant single peak value compared to the rest of the correlation values, the sequences may be considered ternary Gold sequences.

Detection of Ternary Sequences.

Detection of binary sequences usually takes place by way of correlation techniques. The received sequence is correlated with a local copy of the to be detected binary sequence. In many cases the received sequence can be considered to be a superposition of different binary sequences which are orthogonal in cross-correlation. In non-orthogonal cases wherein other sequences do not influence the to be detected sequences in an unmanageable way or wherein they can be considered to be a noise like contribution to the signal it is possible to apply other detection mechanisms.

One such mechanism has been explained by the inventor as one aspect of his inventions in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA.

The mechanism described in the cited Patent Application applies the relation between LFSR based sequence generators and LFSR based scramblers and descramblers. It is possible to descramble the sequence generated by any (binary and non-binary) LFSR based sequence generator into a sequence of identical symbols.

Figure 9:
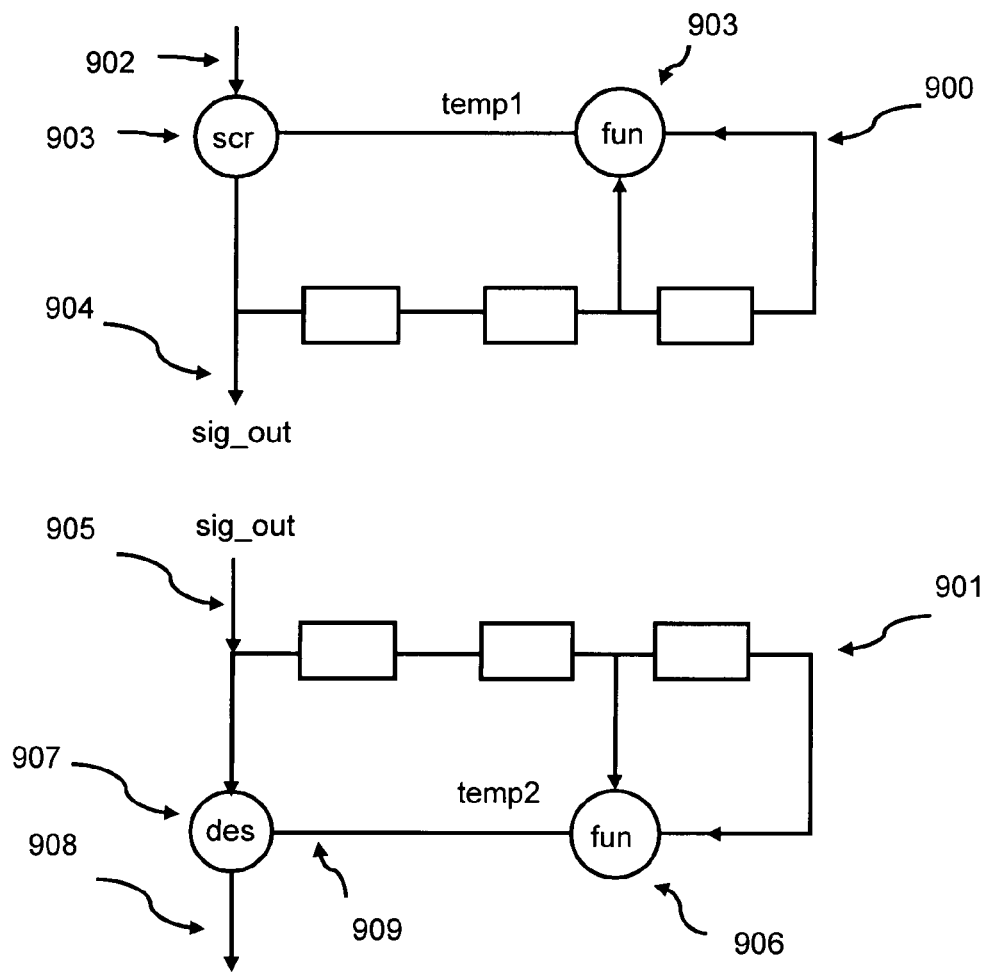
FIG. 9 is a diagram of an LFSR based scrambler and its descrambler.

FIG. 9 shows the generic LFSR based scrambler/descrambler combination. This applies to any n-valued logic. It is to be understood that this is an illustrative example only and that according to different aspects of the invention the length of the shift register as well as the number and the properties of the applied logic functions can vary. In general the circuit 900 is used as the scrambler and circuit 901 as descrambler.

The rules are such that for 900 and 901 to be a scrambling/descrambling pair, they should have the same length shift register. The functions 903 and 906 should be connected to the same tap and their functions should be identical. The functions of 903 and 907 should form a reversing scrambling pair. That is: the function des should inverse the function scr. The functions of 903 and 907 can be identical when scr is self-reversing.

One can actually switch the roles of scrambler and descrambler. In that case the descrambler (previously used as the scrambler) is no longer self-synchronizing and a synchronization circuit is required. Because in that case there will be no "flushing effect" of the shift register in the descrambler, it is essential to start scrambler and descrambler with the same initial content in the shift registers.

For detection purposes, it is advantageous to use scrambler and descramblers in the self-synchronizing setting. In that situation only the first m symbols in a p length sequence in a descrambled sequence can be incorrect, wherein m is the number of shift register elements. Also if the descrambler loses synchronization because of errors in the individual elements of a sequence, after flushing the shift register of the descrambler, synchronization is re-established.

Figure 10:
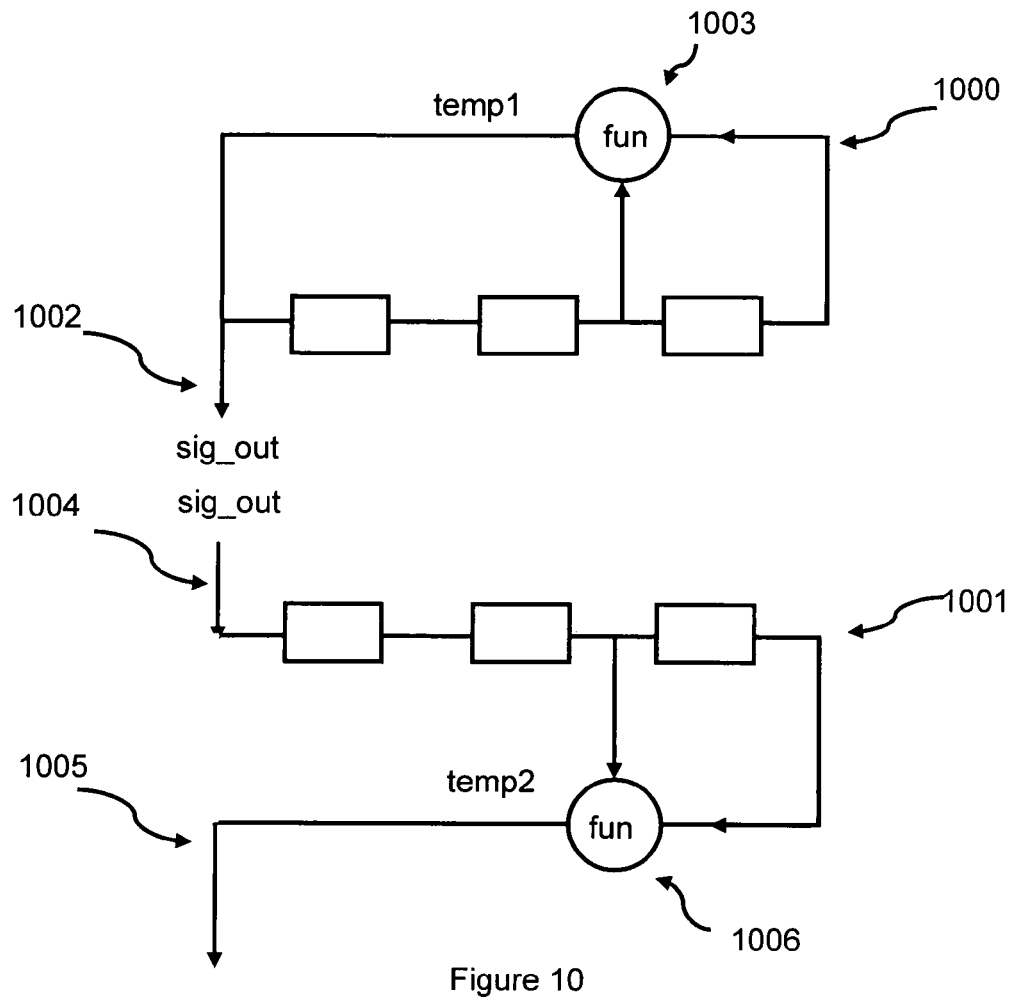
FIG. 10 is a diagram of a sequence generator and a partial descrambler.
Figure 11:
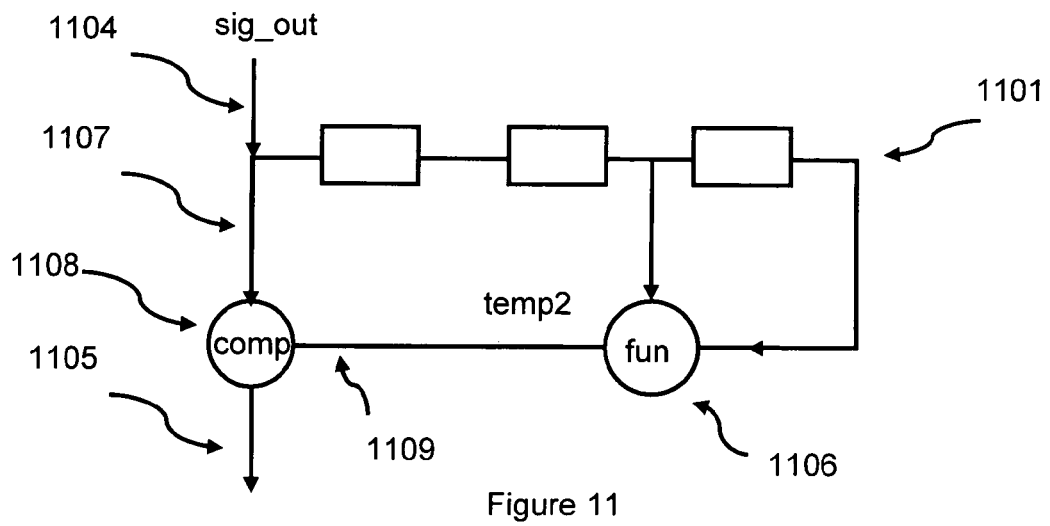
FIG. 11 is a diagram of the descrambler for the sequence generator of FIG. 10.

FIGS. 10 and 11 show in further detail how the descrambling of a sequence would work. Assume that a sequence was generated by circuit 1000 as shown in FIG. 10. When one applies the circuit 1001, inputting the sequence generated by 1000 on input 1004, and assuming the content of the shift register of 1001 is identical to the content of the shift register of 1000 when the symbol in the sequence was generated, then the symbols provided on input 1004 and generated on output 1005 are identical.

A descrambler or detector of the sequence generated by the circuit 1000 can be created by applying a logic function 'compt' which can have as its distinguishing property that its output is a certain value when the two input values are identical.

For example the ternary logic function comp can have the following truth table:

| compt | 0 | 1 | 2 |
|---|---|---|---|
| 0 | 1 | 0 | 2 |
| 1 | 2 | 1 | 0 |
| 2 | 0 | 2 | 1 |

When the two inputs to compt are equal the generated output will be 1. The detection of a sequence comprising all 1s, or having a large portion of 1s, is fairly easy to detect by calculating a digital sum, adding the total number of detected 1s. One can improve the performance by inserting a (scrambled) series of symbols which would indicate the start of an appropriate signal. One can also insert a small sequence at the end to indicate the end of a sequence. When insertion of those start/stop sequences is required one may consider using a scrambler with a particular input as the sequence generator.

The advantage of the method of descrambling a sequence is that no extensive synchronization mechanism is required. When the appropriate sequence enters the detector, a series of for instance is 1s is generated. When the digital sum of the series of identical symbols (or 1s in this example) reaches a certain pre-determined value, one can be fairly certain that a qualified sequence was detected. This method is significantly simpler than determining a correlation, which requires first of all synchronization as well as availability of a local copy of the sequence to be detected. However, it should be evident that when a sequence is a accumulation of individual and orthogonal sequences, this method may not work.

By this method of detecting a sequence by way of descrambling, the problem of sequence availability has been changed into availability of unique scrambler configurations. For lower value logics, such as the ternary case, this may pose a problem when many different sequences are required. In that case the availability of attractive Gold sequences may be more advantageous than the ease of detection by descrambling. It should be recognized that the availability of ternary descrambling solutions increases with the degree (or the length) of the shift register. An indication of the availability of descrambling solutions may be the availability of primitive and irreducible polynomials. The number of primitive and/or irreducible polynomials over GF(n) with n being prime, can be determined on a popular website with URL: http://fchabaud.free.fr/English/default.php?COUNT=1&FILE0=Poly. For GF(3) with degree 4 there are 8 primitive polynomials. So at least 24 good descrambling solutions can be constructed. (Three per polynomial). This is taking into account that some solutions, while not detecting all 1s may generate an inverted version, for instance an all 2s sequence. More descrambling solutions of degree 4 can be created with somewhat lesser random properties. By doubling the number of elements in the shift register to 8 (or degree 8 in GF(3)) there are now 320 polynomials. For a 5-valued logic these numbers are: 150 polynomials of degree 4 over GF(5) and 48,750 polynomials of degree 8 over GF(5).

An additional advantage of using descrambling solutions for detecting sequences is the possibility to easily program user equipment for a specific sequence generator or sequence detector by descrambling. While it is also possible to already hard wire the specific solutions into user equipment it may be beneficial to assign certain sequences to certain channels depending on demand, location of the user related to the base station and congestion status of the network. The base station may then be given the ability to assign specific sequences and program user equipment for either generation or detection of sequences. The same is also possible for Gold sequences. However this will require other and perhaps more extensive efforts.

For illustrative purposes only the following computer script in the Matlab language shows how a descrambler can be programmed by transmitting a sequence called Info to the user equipment. It may be assumed for this purpose that the end user equipment applies a programmable processor that executes the Matlab script.

The vector Info contains the following (for illustrative purposes decimally coded) data elements:
1. deg=Info(1) (degree of the shift register)
2. taps=Info(2) (number of taps)
3. loc=Info(3:5) (location of the taps)
4. fun1=Info(6:14) (first ternary function)
5. fun2=Info(15:23) (second ternary function)
6. fun3=Info(24:32) (third ternary function)
7. comp=Info(33:41) (detection function)
8. init=Info (42:45) (initial content shift register)

Assume in this case that the degree will be 4 and that 2 taps will be connected (the first and the third) using the functions ter1 and ter2 as previously used and the detection function comp. The vector Info will then be: Info=[4 2 1 0 1 3 1 2 2 3 1 1 2 3 1 2 3 1 2 3 1 2 3 1 2 2 3 1 2 2 3 1 2 1 3 3 2 1 1 3 2 2 1 1 3]

The script of the program is listed below:
% programmed ternary descrambler
Info=[4 2 1 0 1 3 1 2 2 3 1 1 2 3 1 2 3 1 2 3 1 2 3 1 2 3 3 1 2
 2 3 1 2 1 3 3 2 1 1 3 2 2 1 1 3]
deg=Info(1)
taps=Info(2)
loc1=Info(3)
loc2=Info(4)
loc3=Info(5)
fun1=Info(6:14)
fun2=Info(15:23)
fun3=Info(24:32)
comp=Info(33:41)
shifts=[Info(42) Info(43) Info(44) Info(45)]
if deg~=4
'resend Info'
end
funt1=tot3(fun1);
funt2=tot3(fun2);
funt3=tot3(fun3);
compt=tot3(comp);
for i=1:80
in1=shifts(1);
in2=shifts(2);
in3=shifts(3);
in4=shifts(4);
temp1=funt3(in3,in4);
temp2=funt2(in2,temp1);
temp3=funt3(in1,temp2);
res(i)=compt(seq(i),temp3);
shifts(4)=shifts(3);
shifts(3)=shifts(2);
shifts(2)=shifts(1);
shifts(1)=seq(i)
end
res The program uses origin 1. Consequently all functions apply origin 1 in their truth tables. The function funt2 should be considered as not connected to tap 2. Its truth table therefore is:

| funt2 | 0 | 1 | 2 |
|---|---|---|---|
| 0 | 0 | 1 | 2 |
| 1 | 0 | 1 | 2 |
| 2 | 0 | 1 | 2 |

Figure 12:
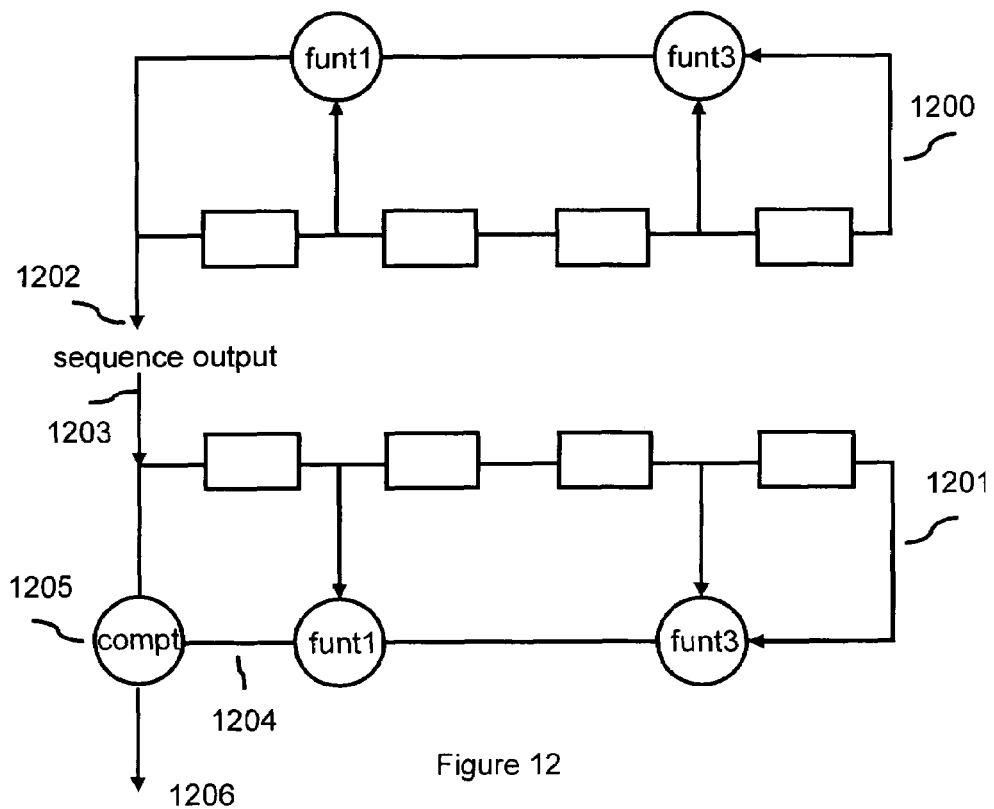
FIG. 12 shows an LFSR based sequence generator and its related descrambler.

The configuration, as realized by the program script, and the corresponding sequence generator are shown in FIG. 12. Circuit 1200 is the sequence generator, outputting a ternary sequence on output 1202. The descrambler realized and executed by the Matlab program is shown as circuit 1201. The sequence is inputted on input 1203. When the circuit 1201 receives the appropriate sequence (and with the correct content of the shift register) the signals on 1204 and 1203 will be identical. The device 1205, executing ternary function compt, will generate all 1s on its output 1206.

A communication system 200 can have a plurality of communication devices 202 to 206 in communication with a base station 201. Each communication device has sequences stored that are used to communicate with the base station 201. The sequences, including the cyclical variants thereof, can be generated by the circuit of FIG. 5 with the logic function ter1, by the circuit of FIG. 5 with the logic function ter2 and/or by the circuit of FIG. 5 with the logic function ter3. These sequences can either be stored in the communication devices 202 to 206 or can be generated by sequence generators in the communication devices 202 to 206.

This system can easily be extended to other multi-value sequences by changing the characteristics of the sequence generator, for example, by changing the length or the tap configuration. Any combination of sequences that can be generated by one or more sequence generators as illustrated in FIG. 5 that used either ter1, ter2, or ter3 can be used. In accordance with one embodiment of the present invention, sequences generated by three sequence generators, each using either ter1, ter2 or ter3, are used by a communication device 202 to 206. Alternatively, sequences that can be generated by sequence generators using the logic functions ter1 and ter2 can be used. Additionally, sequences that can be generated by sequence generators using logic functions ter1 and ter3. Further, sequences that can be generated by sequence generators using logic functions ter2 and ter3 can be used. Further, sequences that can be generated by a sequence generator using ter 1 or ter 2 or ter 3 can be used.

The 4-Valued Case.

The methods, according to several aspects of the present inventions, also apply to 4-valued sequence generators, and scramblers/descramblers. The number 4 is not a prime number and it will take additional efforts (usually through substitution methods), to establish the sequence generators based on Galois Field theory.

An alternative method being an aspect of this invention, used with good results, is to apply reversible 4-valued logic functions at different tap configurations in a computer program and determine its correlation properties. When a configuration generates a sequence with acceptable correlation properties, one can execute all 4-valued logic functions in such a configuration and select the functions that create acceptable sequences. This method circumvents the need for Galois Field theory, can be easily executed in a computer program and generates more sequences than with Galois Field theory.

Figure 13:
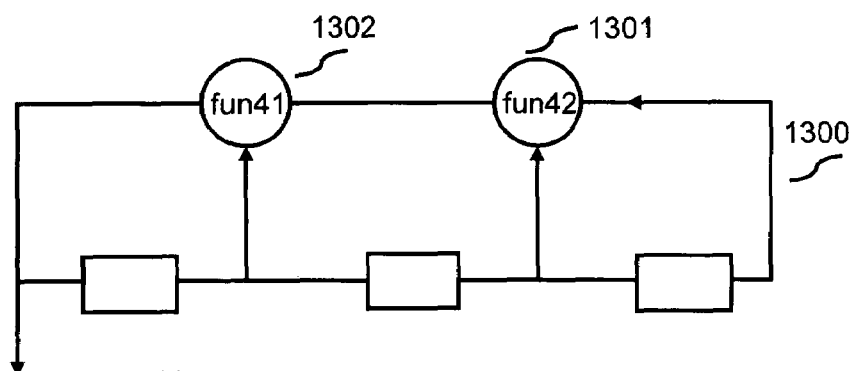
FIG. 13 is a diagram of a sequence generator.

An example of a 4-valued sequence generator is shown in FIG. 13 as circuit 1300, applying a 3 element 4-valued shift register and two 4-valued functions fun41 in device 1302 and fun42 in device 1301, outputting a 4-valued sequence on 1303. The truth tables of the functions fun41 and fun42 are shown in the following tables.

|  | 0 | 1 | 2 | 3 |
|---|---|---|---|---|
| fun41 | | | | |
| 0 | 0 | 1 | 2 | 3 |
| 1 | 1 | 0 | 3 | 2 |
| 2 | 2 | 3 | 0 | 1 |
| 3 | 3 | 2 | 1 | 0 |
| fun42 | | | | |
| 0 | 0 | 1 | 3 | 2 |
| 1 | 1 | 0 | 2 | 3 |
| 2 | 2 | 3 | 1 | 0 |
| 3 | 3 | 2 | 0 | 1 |

This configuration generates a 4-valued m-sequence of length 63 elements. The sequence is shown in the following table:

| 4-valued m-sequence: sm4 | 21330031022212203232010332230211101123131202331132100020013030 1 |
|---|---|

As before, other cyclically related sequences are also generated.

Many more 4-valued m-sequences and 4-valued sequences with good correlation properties can be created using LFSR based sequence generators and 4-valued logic functions, wherein not all are modulo-4 addition functions and no multipliers are used.

Examples of sequences with good correlation properties, generated according to one method of this invention are shown in the following table:

| seq41 | 2113203130020212312011122103331102322302220010131003032332133 01 |
|---|---|
| seq42 | 0021221022200313101201300011032331211231113302023213203332230 10 |
| seq43 | 2113233213331102021231201112210300232230222001313032031000330 12 |
| seq44 | 1030211133102012022101000332032230312220023132131123233300130 11 |

Figure 14:
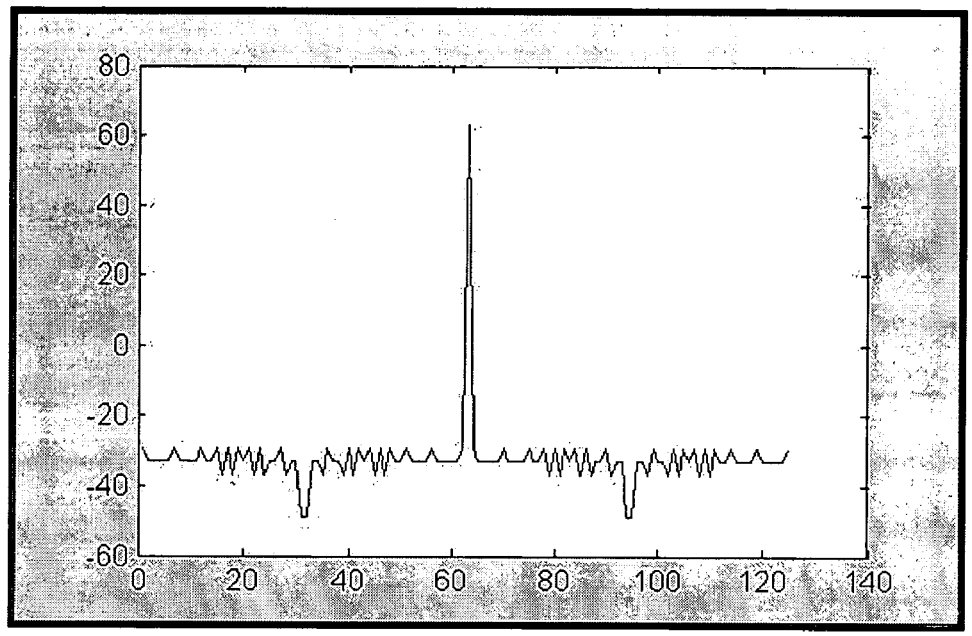
FIG. 14 is an auto-correlation graph for a 4-valued sequence.

The 4 sequences shown in the table are 4 of a set of 48 different sequences created by a 3 element 4-valued LFSR with one feedback tap, wherein each sequence was generated by a generator with a different 4-valued function in the feedback tap. FIG. 14 shows the auto-correlation graph of sequence seq44. All sequences were selected with as criterion that the difference between the highest and second highest correlation value was at least 80.

Figure 15:
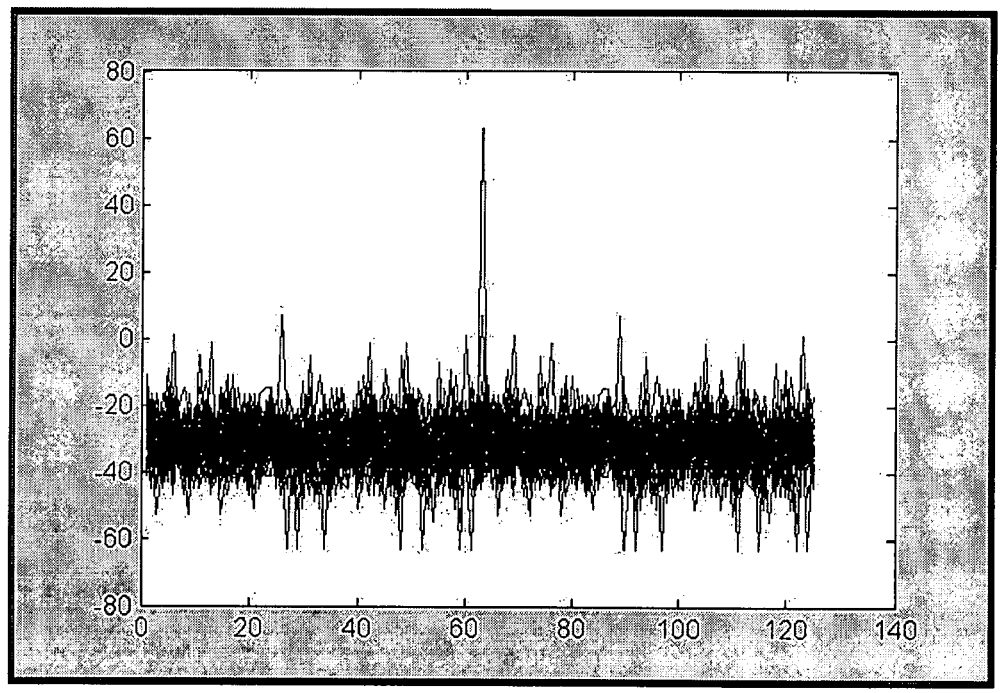
FIG. 15 is an overlay graph of the auto-correlation and cross correlation of 4-valued sequences generated by LFSR based sequence generators.

FIG. 15 shows the overlay of the cross-correlation between 40 of these sequences. The peak is the auto-correlation between two identical sequences. The cross-correlation is at least 55 below the auto-correlation peak.

A Communication System Using Ternary Sequences

In accordance with one aspect of the present invention, a communication system is provided. The communication system has a base station and a plurality of communication devices. Each of the communication devices communicates with the bas station using at least one of a first plurality of sequences comprised of ternary signals, the first plurality of sequences being able to be generated by the previously described sequence generator that uses the ternary function set forth below.

|  | | In2 | |
|---|---|---|---|
| In1 | 0 | 1 | 2 |
| 0 | 1 | 2 | 0 |
| 1 | 0 | 1 | 2 |
| 2 | 2 | 0 | 1 |

The sequences are either generated by previously described sequence generator located on the communication device or they can be first generated by the previously described sequence generator and then stored in memory on the communication device.

The previously described communication device can also communicate with the base station using at least one of a second plurality of sequences comprised of ternary signals, the second plurality of sequences being able to be generated by a sequence generator that uses the ternary function set forth below.

|  | | In2 | |
|---|---|---|---|
| In1 | 0 | 1 | 2 |
| 0 | 0 | 1 | 2 |
| 1 | 2 | 0 | 1 |
| 2 | 1 | 2 | 0 |

Once again the second plurality of sequences is either generated by a second sequence generator located on the communication device or can be stored in memory on the communication device.

The communication devices can also use a different second plurality of sequences that are able to be generated by a sequence generator that uses the ternary function set forth below.

|  | | In2 | |
|---|---|---|---|
| In1 | 0 | 1 | 2 |
| 0 | 2 | 0 | 1 |
| 1 | 1 | 2 | 0 |
| 2 | 0 | 1 | 2 |

Once again the second plurality of sequences is either generated by a second sequence generator located on the communication device or can be stored in memory on the communication device.

The communication system can also use all three of the previously described sequence generators to generate three plurality of sequences that are used by communication devices to communicate with the base station.

In accordance with another aspect of the present invention, another communication system can be provided where the communication devices can communicate with the base station using at least one of a first plurality of sequences comprised of ternary signals, the first plurality of sequences being able to be generated by a sequence generator that uses the ternary function set forth below.

|     | In2 |   |   |
| --- | --- | --- | --- |
| In1 | 0 | 1 | 2 |
| 0 | 2 | 0 | 1 |
| 1 | 1 | 2 | 0 |
| 2 | 0 | 1 | 2 |

Further, the communication system described in the previous paragraph can provide communication devices that can communicate with the base station using at least one of a second plurality of sequences comprised of ternary signals, the second plurality of sequences being able to be generated by a sequence generator that uses the ternary function set forth below.

|     | In2 |   |   |
| --- | --- | --- | --- |
| In1 | 0 | 1 | 2 |
| 0 | 0 | 1 | 2 |
| 1 | 2 | 0 | 1 |
| 2 | 1 | 2 | 0 |

4-Valued Sequences.

The previous sequences are not Gold sequences, but were created by a single LFSR based sequence generator. According to one aspect of this invention it is possible to crate 4-valued Gold sequences by combining the output of 2 LFSR based 4-valued sequence generators through a 4-valued logic function, wherein not all applied 4-valued functions are modulo-4 adders and no multipliers are used.

As an illustrative example a series of 63 4-valued sequences of length 63 can be generated by using a 4-valued function fun44 to combine the 4-valued sequence seq44 and the 4-valued m-sequence sm4 shown in previous tables and by repeating the process for a shifted version of sequence seq44. The truth table of 4-valued function fun44 is shown in the following table:

| fun44 | 0 | 1 | 2 | 3 |
| --- | --- | --- | --- | --- |
| 0 | 1 | 0 | 2 | 3 |
| 1 | 2 | 3 | 1 | 0 |
| 2 | 3 | 2 | 0 | 1 |
| 3 | 0 | 1 | 3 | 2 |

Figure 16:
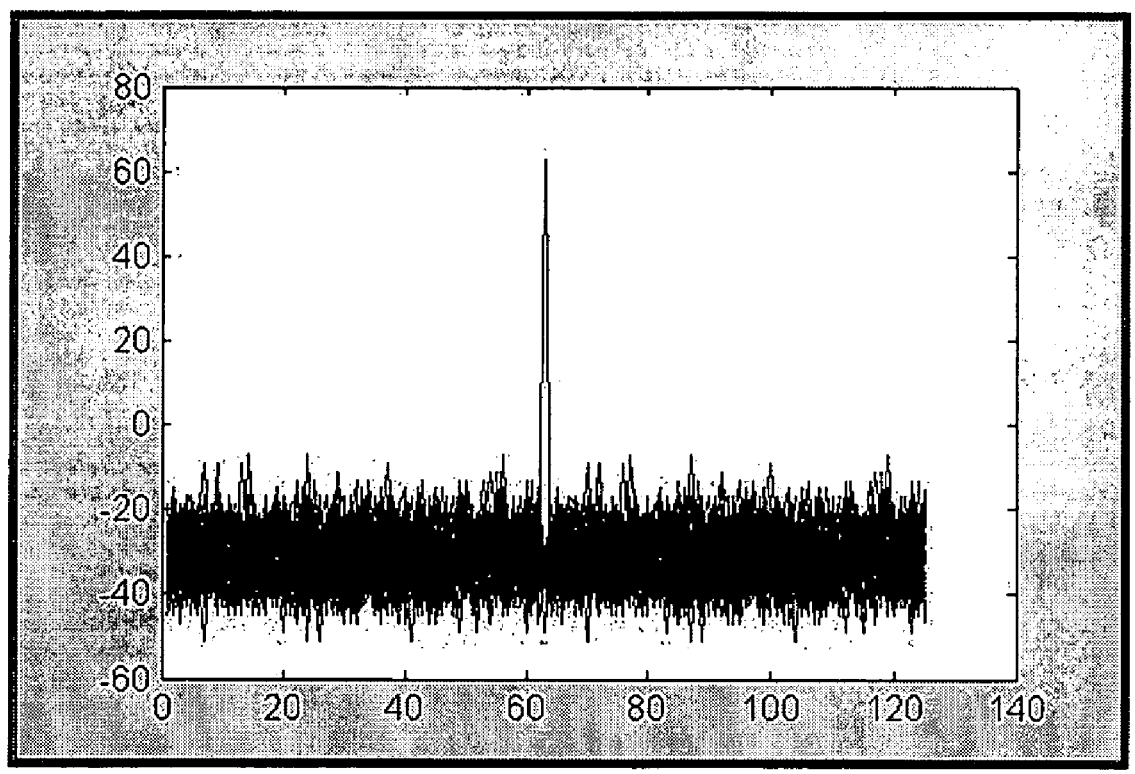
FIG. 16 is an overlay graph of the auto-correlation and cross correlation of 4-valued Gold sequences.

FIG. 16 shows the correlation of one of the thus generated Gold sequences with the 63 sequences. The peak shows the auto-correlation for the selected reference sequence. The cross-correlation of these sequences is somewhat, but still noticeably better than the cross-correlation of the cross-correlation shown in FIG. 15.

According to one aspect of the present invention all possible reversible 4-valued logic functions can be used to combine two 4-valued sequences. Many of the generated 4-valued sequences, created by combining two 4-valued sequences through a 4-valued reversible logic function, not being the modulo-4 addition, will show attractive or adequate correlation properties. A computer program can be used to generate and select the 4-valued combined sequences based on predetermined correlation criteria. When the cross-correlations between these sequences, created by combining two 4-valued sequences, assume values within a limited range, and the individual auto-correlations show a significant single peak value compared to the rest of the correlation values, the sequences may be considered 4-valued Gold sequences. It should be clear that a significant number of different 4-valued Gold sequences can be generated according to the method here provided.

A publication regarding 4-valued Gold sequences is a Ph. D. thesis by Derek Paul Rogers, submitted at the Faculty of Engineering of the University of Adelaide in March 1995, entitled: Non-binary spread-spectrum multiple-access communications. This publication was found and downloaded from the WWW on Feb. 16, 2005. The thesis is mainly concerned with 4-valued Gold sequences. However it applies combinations of (what the author calls) adding and multiplication functions and is thus different from the method here invented applying single combining functions.

Detection of 4-Valued Sequences by Descrambling.

According to one aspect of the present invention it is possible to detect 4-valued sequences, generated by 4-valued based LFSR sequence generators by applying a descrambler, of which the structure is the same as the sequence generator. However, where in the sequence generator the output of the last (or if applicable: the only) logic function is inputted to the first element of the shift register, the output of such logic function is in the descrambler inputted to a first input of a descrambling logic function. The to be descrambled sequence is inputted to a second input of the descrambling function and to the first element of the shift register of the descrambler. The truth table of the descrambling function should be such that when equal symbols are provided to its inputs the descrambling function should generate one value. One example is shown in the following table:

| fundes | 0 | 1 | 2 | 3 |
| --- | --- | --- | --- | --- |
| 0 | 1 | 0 | 2 | 3 |
| 1 | 2 | 1 | 3 | 0 |
| 2 | 3 | 2 | 1 | 2 |
| 3 | 0 | 3 | 0 | 1 |

In the example when the two inputs are equal the function fundes will generate as output the value 1. One can adapt the function to the requirements of a system.

Like in the ternary case, it is possible in a non-orthogonal situation to use 4-valued sequences generated by LFSR based sequence generators and perform detection based on descramblers and a criterion based detector such as a digital sum comparator. While the correlation performance of these sequences may be slightly less than for instance certain Gold sequences, their operations are much simpler than correlation based detectors. It should be clear that additional information (like start/stop patterns) can be attached to sequences. When that is required it may be beneficial to apply an LFSR based scrambler as a sequence generator.

Programmable 4-Valued Detectors and Generators.

According to one aspect of the present invention it is possible to assign additional sequences to certain users in a communication system as shown in FIG. 2. It is also possible for a base station to select the most suitable and available sequences, their method of generation and detection. It is then possible for the base station to send enabling information to individual user equipment within the system, which will program that equipment to generate and detect sequences.

N-Valued Sequences and Gold Sequences.

It should be clear that the methods of the present inventions as they apply to ternary and 4-valued sequence generators, Gold-sequence generators and descramblers also apply to n-valued sequence generators, Gold sequence generators and descramblers, wherein n is an integer greater than 4. With greater values of n (5 and higher) the number of n-valued reversible inverters will be greater. An n-valued logic has n! reversible inverters. The number of reversible scrambling functions grows exponentially with greater values of n. As shown in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA, the correlation performance of n-valued sequences improves when n has greater values. There will in general not be a problem of availability of n-valued sequences, sequence generators, scramblers or descramblers. Computer programs may be used to create, test and select sequences, sequence generators, Gold sequence generators and descramblers.

In accordance with one aspect of the present invention, apparatus for generating sequences of ternary signals that can assume one of three states is provided. The apparatus includes a first sequence generator that can generate a first sequence of ternary signals that can assume one of 3 states on an output of the first sequence generator, a second sequence generator that can generate a second sequence of ternary signals that can assume one of 3 states on an output of the second sequence generator; and a first ternary logic device having a first input connected to the output of the first sequence generator, having a second input connected to the output of the second sequence generator and having an output. A ternary sequence appears on the output of the first ternary logic device.

In accordance with another aspect of the present invention, the ternary logic device has an output and a third sequence of ternary signals appears on the output of the ternary logic device when the first sequence generator outputs the first sequence of ternary signals and when the second sequence generator outputs the second sequence of ternary signals.

In accordance with another aspect of the present invention, the ternary logic device executes a ternary logic function defined by a truth table where each of its columns is a ternary reversible inverter, but not a modulo-3 adder.

In accordance with another aspect of the present invention, the first sequence generator includes a first multi-element shift register and at least one ternary reversible logic device or function, not being the modulo-3 adder and has no multipliers.

In accordance with another aspect of the present invention, the first sequence generator generates a ternary sequence, which can be characterized by:

a polynomial of degree p (with p being 2 or greater) and k (with k not greater than p−1) coefficients not equal to 0;

the length of the sequence being $3^P-1$ ternary elements;

the auto-correlation, being the correlations over $2*3^P-1$ positions between the sequence and its phase shifted versions shows one large absolute peak value at the coinciding phase of the sequence and its phase shifted version and is lower at all other positions.

In accordance with another aspect of the present invention, the second sequence generator includes a second multi-element shift register.

In accordance with another aspect of the present invention, the second sequence generator generates a ternary sequence, which can be characterized by:

a polynomial of degree p (with p being 2 or greater) and k (with k not greater than p−1) coefficients not equal to 0;

wherein p has the same value as before and the coefficients of the irreducible polynomials are not identical to the ones before;

the length of the sequence being $3^P-1$ ternary elements;

the auto-correlation, being the correlations over $2*3^P-1$ positions between the sequence and its phase shifted versions shows one large absolute peak value at the coinciding phase of the sequence and its phase shifted version and is predominantly constant at all other positions.

In accordance with another aspect of the present invention, apparatus for generating a set of sequences of ternary signals that can assume one of three states, is provided. The apparatus includes a first sequence generator that can generate a first sequence of ternary signals that can assume one of 3 states on an output of the first sequence generator; a second sequence generator that can generate a set of $3^P-1$ different but related second sequences of ternary signals that can assume one of 3 states on an output of the second sequence generator wherein each different sequence is formed by phase shifting each element of the previous sequence by one position in a circular fashion; a first ternary logic device having a first input connected to the output of the first sequence generator and a second input connected to the output of the second sequence generator.

A set of $3^P-1$ different ternary Gold sequences is generated on an output of the first ternary logic device, the set of ternary Gold sequences characterized by: an auto-correlation with a single peak value on the coinciding phase of the correlation between the generated ternary sequence and a phase shifted copy of itself and a correlation value that is limited to a much lower maximum and minimum value in all other phases and a cross-correlation value between each of the generated sequences that is limited to a maximum and minimum value that is much lower than the peak value of the auto-correlation of each individual sequence.

In accordance with another aspect of the present invention, the first ternary sequence generator in the above apparatus generates a sequence and the second ternary sequence generator generates a set of $3^P-1$ different ternary sequences with $3^P-1$ ternary elements by phase shifting each element of the sequence at least one position in a circular fashion and the output of the ternary logic device creates a ternary sequence characterized by having a length of $3^P-1$ ternary elements.

In accordance with another aspect of the present invention, a method for generating sequences of multi-valued signals that can assume one of x states, x being greater than or equal to three, is provided. The method includes generating a first sequence of multi-valued signals that can assume one of x states; generating a second sequence of multi-valued signals that can assume one of x states; and inputting the first sequence of multi-valued signals and the second sequence of multi-valued signals to a first multi-valued logic device, the device not being a modulo-x adder.

The method further includes outputting a third sequence of multi-valued signals on the output of the multi-valued logic device.

In the method, the step of generating a first sequence of multi-valued signals is performed using a first multi-element shift register. The step of generating a second sequence of multi-valued signals is performed using a second multi-element shift register.

In accordance with another aspect of the present invention, the step of generating a first sequence of multi-valued signals is performed using a first multi-element shift register and at least a second multi-valued logic device that implements a second multi-valued logic function. Also, the step of generating a second sequence of multi-valued signals is performed using a second multi-element shift register and at least a third multi-valued logic device that implements a third multi-valued logic function.

In accordance with another aspect of the present invention, the third sequence of multi-valued signals is a Gold sequence.

It has been shown that the benefits of assigning additional sequences to a single user depend among others on the cost of realizing and utilizing the additional sequences. It has been shown that at a certain number of symbol-levels or number of sequences it may be more cost effective to create another channel or apply additional carriers.

The following patent applications, including the specifications, claims and drawings, are hereby incorporated by reference herein, as if they were fully set forth herein: (1)U.S. Provisional Patent Application No. 60/575,948, filed on Jun. 1, 2004, entitled MULTI-VALUE CODING OF SEQUENCES AND MULTI-VALUE MEMORY DEVICES; (2)U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (3)U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS; (4)U.S. Non-Provisional patent application Ser. No. 10/936,181, filed Sep. 8, 2004, entitled TERNARY AND HIGHER MULTI-VALUE SCRAMBLERS/DESCRAMBLERS; (5)U.S. Non-Provisional patent application Ser. No. 10/912,954, filed Aug. 6, 2004, entitled TERNARY AND HIGHER MULTI-VALUE SCRAMBLERS/DESCRAMBLERS; (6)U.S. Provisional Patent Application No. 60/501,335, filed Sep. 9, 2003, entitled TERNARY (3-VALUE) AND HIGHER VALUE DIGITAL SCRAMBLERS/DESCRAMBLERS IN DIGITAL COMMUNICATIONS; (7) U.S. patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (8) U.S. Provisional Patent Application No. 60/599,781, filed Aug. 7, 2004, entitled MULTI-VALUED DIGITAL INFORMATION RETAINING ELEMENTS AND MEMORY DEVICES; (9) U.S. patent application Ser. No. 11/018,956, filed Dec. 20, 2004, entitled MULTI-VALUE DIGITAL CALCULATING CIRCUITS, INCLUDING MULTIPLIERS and (10) U.S. patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA.

The invention claimed is:

1. An apparatus for generating a set of sequences of ternary signals wherein each multi-value signal can assume one of three states, comprising:
 a first sequence generator that can generate a first sequence of ternary signals wherein each multi-value signal can assume one of 3 states on an output of the first sequence generator;
 a second sequence generator that can generate a set of $3^p-1$ with p>1 different but related second sequences of ternary signals wherein each multi-value signal can assume one of 3 states on an output of the second sequence generator wherein each different sequence is formed by phase shifting each element of the previous sequence by one position in a circular fashion;
 a first ternary logic device having a first input connected to the output of the first sequence generator and a second input connected to the output of the second sequence generator;
 wherein a set of $3^p-1$ different ternary Gold sequences is generated on an output of the first ternary logic device, the set of ternary Gold sequences characterized by:
 an auto-correlation with a single peak value on the coinciding phase of the correlation between the generated ternary sequence and a phase shifted copy of itself and a correlation value that is limited to a lower maximum and minimum value in all other phases;
 a cross-correlation value between each of the generated sequences that is limited to a maximum and minimum value that is lower than the peak value of the auto-correlation of each individual sequence; and
 a correlation value between two ternary signals being determined by including a step of adding a first value to a sum whenever the two ternary signals are determined to be equal.

2. A method for generating on an output of a sequence generator a sequences of multi-valued signals, a multi-valued signal able to assume one of x states, x being greater than or equal to three, comprising:
 generating with a first device a first sequence of multi-valued signals wherein each multi-valued signal can assume one of x states;
 generating with a second device a second sequence of multi-valued signals wherein each multi-valued signal can assume one of x states;
 inputting the first sequence of multi-valued signals and the second sequence of multi-valued signals on the sequence generator having at least a first multi-valued logic device having at least two inputs and an output, the first multi-valued logic device implementing an x-valued logic function and generating a third sequence of multi-valued signals on the output of the sequence generator wherein each multi-valued signal can assume one of x states; and
 determining by a correlating device a correlation value for the third sequence of multi-valued signals by including a step of adding a first value to a sum whenever a multi-valued signal in the third sequence is determined to be identical to a corresponding signal in a fourth sequence of signals.

3. The method as claimed in claim 2, wherein the step of generating the first sequence of multi-valued signals is performed using a first multi-element shift register.

4. The method as claimed in claim 3, wherein the step of generating the second sequence of multi-valued signals is performed using a second multi-element shift register.

5. The method as claimed in claim 2, wherein the step of generating the first sequence of multi-valued signals is performed using a first multi-element shift register and at least a second multi-valued logic device that implements a second multi-valued logic function.

6. The method as claimed in claim 5, wherein the step of generating the second sequence of multi-valued signals is performed using a second multi-element shift register and at least a third multi-valued logic device that implements a third multi-valued logic function.

7. The method as claimed in claim 6, wherein the third sequence of multi-valued signals is a Gold sequence.

8. An apparatus for generating a sequences of multi-value signals wherein each multi-value signal can assume one of x states, x being greater than or equal to three, comprising:

a first sequence generator that can generate a first sequence of multi-value signals wherein each multi-value signal can assume one of x states on an output of the first sequence generator;

a second sequence generator that can generate a second sequence of multi-value signals wherein each multi-value signal can assume one of x states on an output of the second sequence generator; and a third sequence generator having at least a first and a second input and an output, wherein:
the first input is enabled to receive the first sequence of multi-value signals;
the second input is enabled to receive the second sequence of multi-value signals;
the output is enabled to generate the sequence of multi-value signals; and
at least one of the first, the second and the third sequence generator implements a reversible non-commutative x-valued logic function.

9. The apparatus as claimed in claim 8, wherein the first sequence generator includes a first multi-element shift register.

10. The apparatus as claimed in claim 9, wherein the second sequence generator includes a second multi-element shift register.

11. The apparatus as claimed in claim 8, wherein the first sequence generator includes a first multi-element shift register and at least a second multi-value logic device that implements a second multi-value logic function.

12. The apparatus as claimed in claim 11, wherein the second sequence generator includes a second multi-element shift register and at least a third multi-value logic device that implements a third multi-value logic function.

13. The apparatus as claimed in claim 12, wherein the third sequence of multi-value signals is a Gold sequence.

14. The apparatus as claimed in claim 8, wherein the apparatus is included in a communication system.

15. A method for generating a sequence of multi-value signals, wherein a multi-value signal can assume one of x states, x being greater than or equal to three, comprising:
generating by a first sequence generator a first sequence of multi-value signals wherein a multi-value signal can assume one of x states;
generating by a second sequence generator a second sequence of multi-value signals wherein a multi-value signal can assume one of x states;
inputting the first sequence of multi-value signals and the second sequence of multi-value signals on a third sequence generator having at least a first and a second input and an output, wherein at least one of the first, the second and the third sequence generator implements at least one of the group consisting of a non-commutative x-valued logic function and a x-valued inverter not inverting state 0 to state 0; and
generating the sequence of multi-value signals on the output of the third sequence generator.

16. The method as claimed in claim 15, wherein the step of generating the first sequence of multi-value signals is performed using a first multi-element shift register.

17. The method as claimed in claim 16, wherein the step of generating the second sequence of multi-value signals is performed using a second multi-element shift register.

18. The method as claimed in claim 15, wherein the step of generating the first sequence of multi-value signals is performed using a first multi-element shift register and at least a second multi-value logic device that implements a second multi-value logic function.

19. The method as claimed in claim 18, wherein the step of generating the second sequence of multi-value signals is performed using a second multi-element shift register and at least a third multi-value logic device that implements a third multi-value logic function.

20. The method as claimed in claim 19, wherein the third sequence of multi-value signals is a Gold sequence.

21. A detector for detecting a sequence of n-valued symbols with n>2 generated by a sequence generator, comprising:
an n-valued Linear Feedback Shift Register (LFSR), the n-valued LFSR including:
a shift register of k with k>1 n-valued elements, the shift register having an input, the input enabled to receive the sequence of n-valued symbols;
an implementation of an n-valued function, including a first and a second input and an output; and
an implementation of an n-valued detecting function with a first and a second input and an output, the first input enabled to receive the sequence of n-valued symbols and being connected to the input of the shift register, the second input being connected to the output of the implementation of the n-valued function and the output of the implementation of the n-valued detecting function enabled to provide a sequence of symbols indicating detection of the sequence of n-valued symbols.

22. The detector as claimed in claim 21, wherein the output of the implementation of the n-valued detecting function provides a symbol in a first state when symbols received on the first and second input of the implementation of the n-valued detecting function have the same state and wherein the output of the implementation of the n-valued detecting function provides a symbol not in a first state when symbols received on the first and second input of the implementation are different in state.

23. The detector as claimed in claim 22, wherein at most k symbols in the sequence of symbols indicating detection are not in a first state when the sequence of n-valued symbols is being detected.

24. The detector as claimed in claim 21, wherein the detector is included in a communication system.

* * * * *

UNITED STATES PATENT AND TRADEMARK OFFICE
CERTIFICATE OF CORRECTION

| | | |
|---|---|---|
| PATENT NO. | : 7,580,472 B2 | Page 1 of 1 |
| APPLICATION NO. | : 11/065836 | |
| DATED | : August 25, 2009 | |
| INVENTOR(S) | : Peter Lablans | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Fourteenth Day of September, 2010

David J. Kappos
*Director of the United States Patent and Trademark Office*